(12) United States Patent
Hoeldrich

(10) Patent No.: US 9,994,080 B2
(45) Date of Patent: Jun. 12, 2018

(54) REGENERATION OF AN AIR DRYER ON A VEHICLE

(71) Applicant: AGCO INTERNATIONAL GmbH, Hesston, KS (US)

(72) Inventor: Bernhard Hoeldrich, Ingenried (DE)

(73) Assignee: AGCO International GmbH, Neuhausen (CH)

( * ) Notice: Subject to any disclaimer, the term of this patent is extended or adjusted under 35 U.S.C. 154(b) by 5 days.

(21) Appl. No.: 15/221,888

(22) Filed: Jul. 28, 2016

(65) Prior Publication Data

US 2017/0036162 A1    Feb. 9, 2017

(30) Foreign Application Priority Data

Aug. 3, 2015    (GB) .................................. 1513659.1

(51) Int. Cl.
*B60C 23/00* (2006.01)
*B01D 53/26* (2006.01)
*B60J 7/08* (2006.01)

(52) U.S. Cl.
CPC .......... *B60C 23/003* (2013.01); *B01D 53/261* (2013.01); *B60C 2200/08* (2013.01); *B60J 7/085* (2013.01)

(58) Field of Classification Search
CPC ........................... B60C 23/003; B01D 53/261
See application file for complete search history.

(56) References Cited

U.S. PATENT DOCUMENTS

| 4,812,148 | A | 3/1989 | Hata et al. | |
|---|---|---|---|---|
| 2002/0136645 | A1* | 9/2002 | Folchert | B60G 17/0523 417/302 |
| 2003/0183077 | A1 | 10/2003 | Hoffman et al. | |
| 2004/0026835 | A1* | 2/2004 | Folchert | B60G 17/0523 267/64.16 |
| 2004/0262986 | A1* | 12/2004 | Folchert | B60G 17/0523 303/1 |
| 2005/0258680 | A1* | 11/2005 | Blackwood | B01D 53/261 303/2 |

(Continued)

FOREIGN PATENT DOCUMENTS

| DE | 2813601 A1 | 10/1979 | |
|---|---|---|---|
| DE | 102012106549 A1 * | 5/2014 | ........... B60C 23/003 |

(Continued)

OTHER PUBLICATIONS

UK Intellectual Property Office, International Search Report for priority Application No. GB1513659.1, dated Feb. 1, 2016.

(Continued)

*Primary Examiner* — Kip T Kotter

(57) ABSTRACT

An air supply system on a vehicle for inflating and deflating a tire. The system includes a compressor connected to a drier having drying material to extract water from the air and a deflation line connectable between the tire and the dryer. The air dryer is operable in a first mode in which air passing through the dryer in a first direction is dried by the dryer and a second regeneration mode in which air passes through the dryer in a direction opposite to the first to remove water collected by the dryer, characterized in that the air used for the regeneration is air deflated from the tire.

8 Claims, 6 Drawing Sheets

(56) References Cited

U.S. PATENT DOCUMENTS

| | | | |
|---|---|---|---|
| 2008/0251177 A1* | 10/2008 | Sandoni | B60C 23/003 |
| | | | 152/416 |
| 2009/0032158 A1 | 2/2009 | Rudolf et al. | |
| 2010/0186827 A1* | 7/2010 | Ertl | B60T 17/002 |
| | | | 137/115.25 |
| 2011/0052419 A1* | 3/2011 | Bordacs | B01D 53/0454 |
| | | | 417/53 |
| 2013/0192681 A1* | 8/2013 | Meier | F17D 1/02 |
| | | | 137/2 |
| 2015/0218987 A1* | 8/2015 | Minato | B01D 53/0407 |
| | | | 96/113 |
| 2015/0251646 A1* | 9/2015 | Eberling | B60T 17/004 |
| | | | 95/21 |

FOREIGN PATENT DOCUMENTS

| | | |
|---|---|---|
| GB | 1315426.5 A | 3/2015 |
| JP | 2890539 B2 | 5/1999 |
| WO | 99/43527 A1 | 9/1999 |
| WO | 2015/134362 A1 | 9/2015 |

OTHER PUBLICATIONS

European Patent Office, International Search Report for related EP Application No. EP16181488, dated Dec. 12, 2016.

* cited by examiner

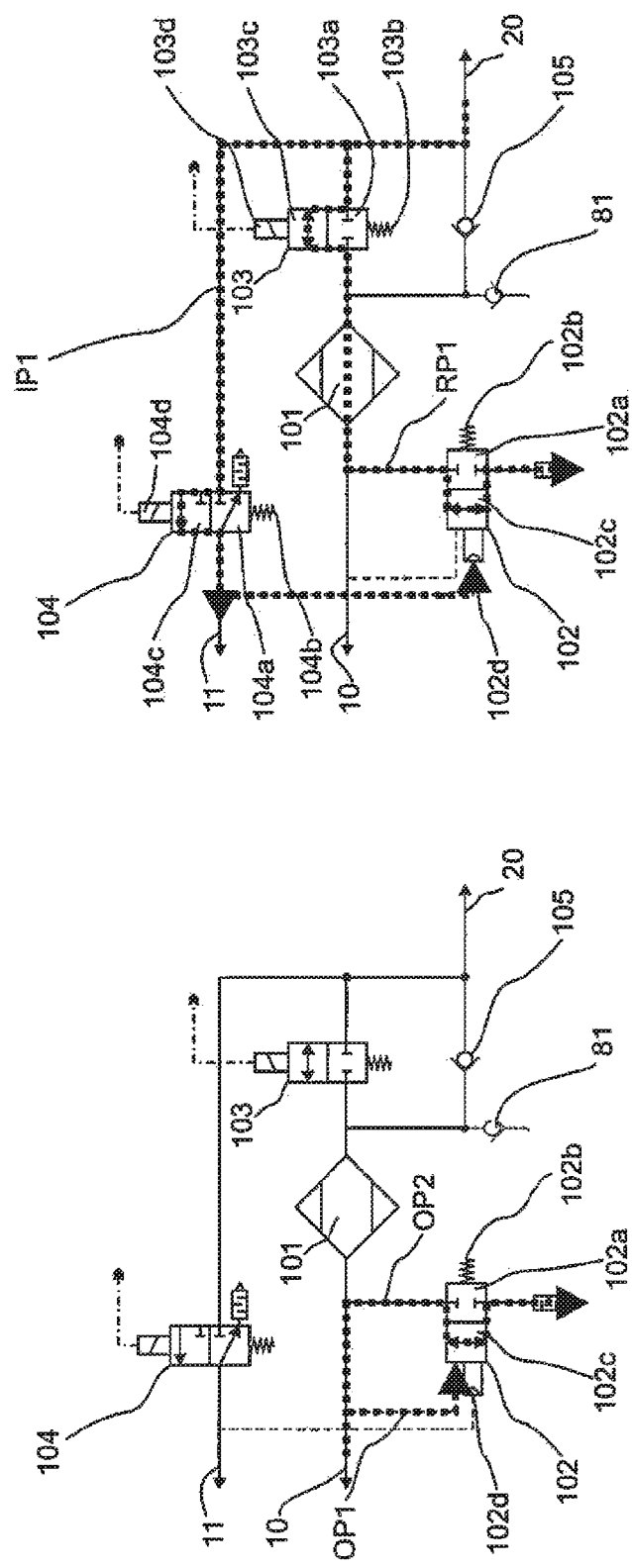

REGENERATION OF AN AIR DRYER ON A VEHICLE

BACKGROUND OF THE INVENTION

Field of Invention

The invention relates to an air supply system on a vehicle, comprising a Tire Pressure Control System (TPCS) and an air dryer. More specifically, the invention concerns a means for drying air used within a TPCS on a tractor.

Description of Related Art

Vehicle air supply systems require air dryers to discharge humidity from the air before supplying it to consumers on a vehicle. Damp air can cause corrosion in pipes and other components on the vehicle, so before supplying air to consumers, or air reservoirs (for example, for the vehicle's brake system) the air is usually guided through a dryer. When the air is passing through the dryer to dry the air, this mode of operation is known as a drying mode.

Due to the restricted load capacity of dryers, a second operation mode, known as a regeneration mode is required which involves passing air through the reservoir in an opposite direction and discharging it to the atmosphere. A regeneration mode thus removes water deposited in, or on the drying material of the dryer.

It is known to use double chamber dryers which comprise two separate dryer reservoirs, so that if one chamber is drying the air from the compressor in a drying mode, the other chamber is in a regeneration mode. The shift between the two modes of each drying chamber is time-controlled, so that the dryer may continually be used to dry air.

Furthermore, Electrically Operated Air Dryers (EOD) are also known. These dryers only require one dryer portion and the shift between the two modes of operation, that is the switch between the regeneration mode and the drying mode is not time controlled by a control unit. The two modes are controlled by measuring the volume of air passing through the dryer by measuring the compressor time or measuring the pressure rise in the reservoirs (and knowing that a certain pressure rise requires a predetermined air volume). A percentage of the volume of air in the air supply system is then guided back for the regeneration.

Even if the usage of EODs reduces regeneration time, a percentage of the volume of air (approximately 12%) is still required for regeneration and is not available for the general air supply to components. For example, after drying 1000 liters of air within an air supply system, 12% of the volume, that is 120 liters must be used for regeneration. The efficiency of the system is therefore reduced.

BRIEF SUMMARY OF THE INVENTION

One aspect of the invention is directed to an air supply system on a vehicle for inflating and deflating a tire. The system includes a compressor connected to a drier provided with drying material to extract water from the air and a deflation line connectable between the tire and the dryer, said air dryer operable in a first mode in which air passing through the dryer in a first direction is dried by the dryer and a second regeneration mode in which air passes through the dryer in a direction opposite to the first to remove water collected by the dryer. The air used for the regeneration is air deflated from the tire. In this way, the efficiency of the air supply system is increased, since air for supplying consumers on the vehicles is not used for regeneration of the dryer.

Preferably the system calculates a first value representing a volume of air deflated from the tire and a second value representing a volume of air needed for regeneration and compares said first and second values to calculate if there is sufficient deflated air for regeneration.

If the second value is greater than the first value, the regeneration is preferably conducted using air deflated from the tire and using air from a reservoir of the dryer, or of a consumer.

This way regeneration of the dryer can be ensured without impacting on the supply of air to consumers on the tractor.

The compressor is preferably deactivated to enable deflated air from the tire to be fed to the dryer.

More preferably, the system postpones deflation of the tire if the compressor is not deactivated. This way efficiency of the system is maintained.

The air supply system preferably comprises a tire pressure control system (TPCS) circuit and a dryer circuit, wherein the compressor and dryer are located in a dryer circuit having a flow return valve arranged so that air supplied by the compressor to the tire is dried and said dryer circuit further comprising a port connectable to the TPCS circuit so that air deflated from the tire through the TPCS circuit passes through the dryer for regeneration, or is supplied directly to a consumer on the vehicle.

Dry air deflated from the tire thus does not have to be dried again and can be supplied directly to consumers.

Advantageously, the air supply system further comprises detection means to detect when the tire is inflated by an external air supply and where this is the case the system uses air from a reservoir of a consumer for regeneration.

This way air which has not been dried prior to reaching the tire is not used for regeneration.

The detection means preferably measures the tire pressure and where there is an increase in tire pressure, but the compressor has not been used to inflate the tire the system detects the use of an external air supply.

Preferably, the air taken from the TPCS is provided by a reservoir located within the tire.

In the case of a wheel comprising both an inner tire and an outer tire and comprising two reservoirs located on the wheel, air taken from one of these reservoirs may be used for regeneration of the dryer without affecting the pressure of the other reservoir.

The air used for the regeneration from the tire may pass through a filtration means.

In this way any particles from inside the tires which end up in the air used for regeneration are filtered out. Undesired particles/debris found in the tires may have resulted from wear of the tires, or may have been introduced into the tires from an external air supply.

A Tire Pressure Control System (TPCS) used on agricultural tractors is able to determine the air flow (and therefore any increase or decrease in air volume over a time interval) as described in GB 1315426.5. The system can store a characteristic map of the relationship between a change in tire pressure and a change in air volume as the tire is inflated or deflated. For example, for a desired tire pressure, the system will calculate the volume of air which must be added or subtracted to reach the desired pressure.

BRIEF DESCRIPTION OF THE DRAWINGS

The invention will now be described, by way of example only, with reference to the following drawings in which:

FIGS. 2a-2d are circuit diagrams of known modes of operation of an Electrically Operated Air Dryer;

Corresponding reference characters indicate corresponding parts throughout the several views of the drawings.

DESCRIPTION OF PREFERRED EMBODIMENTS

Figure 1:
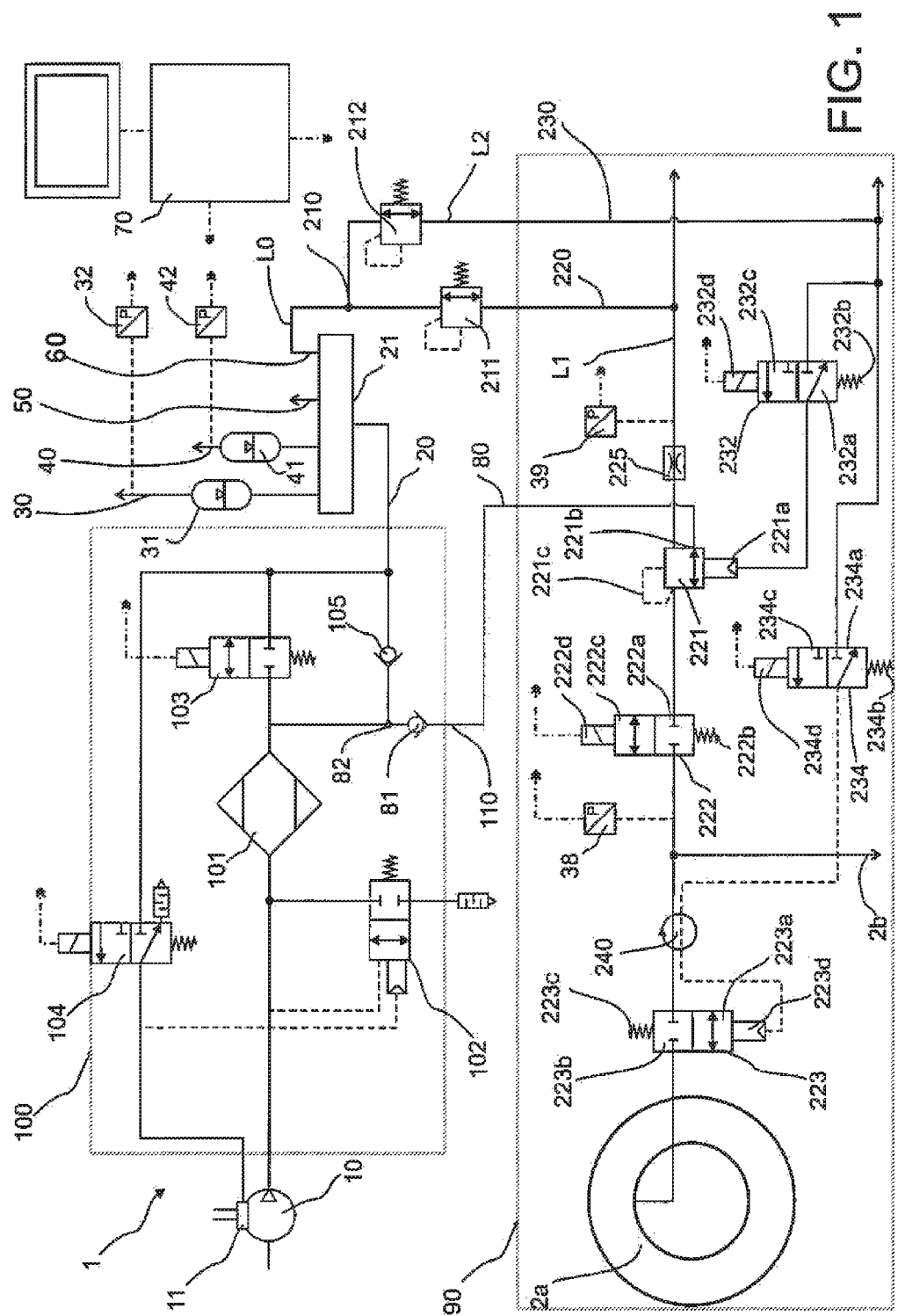
FIG. 1 is circuit diagram of a Tractor Pressure Control System and an Electrically Operated Air Dryer embodying the invention.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 shows a circuit diagram of a Tractor Pressure Control System (TPCS) 90 and an Electrically Operated Air Dryer (EOD) 100 on a tractor 1 having one wheel 2a fitted with a tire. Further tires (not shown) are connectable to the TPCS as indicated by arrow 2b. The tractor 1 is provided with a wheel 2a connected to the TPCS for inflation and deflation of its tire. For the avoidance of doubt, the term deflation means that air is let out of the tire. The term deflated air thus means the air which has been let out from the tire. A compressor 10 supplies air to components on a vehicle via the EOD. The EOD is connected to various consumers 30, 40, 50, 60 and the TPCS 90 via a consumer branch 20 and protection valve means 21. Reservoirs 31, 41 are assigned to consumers 30, 40 and are equipped with pressure sensors 32, 42 to measure their pressure. Consumers 50 or 60 may also be equipped with respective reservoirs or sensors. Generally the reservoirs are kept at a defined pressure level, for example 8.5 bar to ensure that they can deliver the required air pressure when required, for example during braking.

Protection valve means 21 balances the pressure required to be supplied to the primary set of consumers 30, 40 and the secondary consumers 50, 60 and will cut the supply to any consumer should a consumer develop a leak. In this way, the integrity of the remaining (primary) consumers is maintained. Furthermore, protection valve means 21 ensures that supply to primary consumers is prioritised over the supply to secondary consumers, such as the TPCS. In tractors or trucks, primary consumers 30 and 40 may be parallel brake circuits for a dual-circuit service brake. Secondary consumers 50, 60 may be a parking brake, an air suspension of the cab and wheels, or the TPCS.

The components of the TPCS 90 are explained in detail:

Generally, the TPCS comprises two separate circuits which represent two functions of the system.

One circuit is the supply circuit 220 which is branched off the main TPCS line L0 at connection 210 for connecting supply line L1 to wheel 2a to supply air to the respective tire. This circuit must be capable of high air flow rates at high pressures to ensure fast inflation of a tire.

A second circuit, control circuit 230 is also branched off the main TPCS line L0 at connection 210 to connect with pilot control line L2. The control circuit 230 activates the deflation and inflation process by components of the supply circuit 220.

Control circuit 230 mainly contains pilot valves which for clarity are omitted in FIG. 1. Various pilot valve configurations may be used, as for example, those shown in PCT/EP2014/065935. In FIG. 1 the pilot control valves 232 and 234 are provided for pneumatically controlling main control valve 221 and second stop valve 223 of the supply circuit 220. All components of the control circuit are specified for low air flows as the pilot function requires only low air flows. The lower pressures and air flow in control circuit 230 enables the use of smaller and cheaper components, especially valves, which improves procurement, costs and installation space. Furthermore, the use of low pressures enables greater accuracy when sensors are installed, as the accuracy is decreased by a greater range of operation.

To maintain the different pressure levels in both circuits 220, 230 excess flow valves 211, 212 are provided. If the pressure level exceeds the set level in the TPCS circuit, the connection is blocked to protect the components of the TPCS. For example, excess flow valve 211, assigned to supply circuit 220 may be set to a maximum pressure between 7.1 to 7.5 bar, hereinafter referred to as the supply pressure. Excess flow valve 212, assigned to pilot control circuit 230, may be set to a maximum pressure between 4.5 to 5 bar, hereinafter referred to as the pilot control pressure.

The supply circuit 220 is provided with a main control valve 221 to regulate the pressure in the tire 2a. The main control valve 221 is controlled by pilot valve 232. Port 221a is connected to pilot control valve 232 which has two operating conditions for providing pilot control. Pilot control valve 232 is biased into a closed position 232a by a spring means 232b and can be moved to an open position 232c to allow air flow. In the closed position 232a, port 221a is connected to the atmosphere. The valve 232 may be moved into the open position 232c against the force of the spring 232b by energising solenoid 232d which is electrically connected to control unit 70. For clarity reasons, the electric connections to the control unit 70 are only indicated by a double arrow.

Main control valve 221 has two operating conditions:

In a first condition, the tire of wheel 2a is connected to the air supply via main TPCS line L0 and supply line L1 for inflation of the tire. In a second condition (shown in FIG. 1) the tire of wheel 2a is connected to the atmosphere via port 221b for deflation. With respect to the inflation operation, main control valve 221 is provided with a feedback via line 221c which ensures that the pressure level in the supply circuit after the main control valve 221 does not exceed 4.5-5 bar as the pressure in line 221c counteracts against the pressure coming from the control circuit 230 via the valve 232 which is set to a maximum of 4.5-5 bar. This balancing ensures that the tires are not charged with more than 5 bar representing an acceptable level. On the other hand, the higher pressure (adjusted to a maximum of 7.5 bar by excess flow valve 211) in the supply circuit 220 prior to main control valve 221 increases the performance of the TPCS. For clarity reasons, the electric connections to the control unit 70 are only indicated by a double arrow.

A first stop valve 222 is positioned between the main stop valve 221 and the wheel 2a to allow inflation and deflation of the tire. First stop valve is biased into closed position 222a by a spring means 222b and can be moved to an open position 222c to allow air flow. The valve 222 may be moved into the open position 222c against the force of the spring 222b by energising solenoid 222d electrically connected to control unit 70. For clarity reasons, the electric connections to the control unit 70 are only indicated by a double arrow. Between valve 222 and a rotatable passage 240 located in the trumpet housing of the wheel, the supply line L1 branches off to another tire or tires on the tractor, as represented by the arrow 2b.

Each wheel has a respective rotatable passage 240 which connects the supply line L1 in circuit 220 to the wheel 2a. Supply line L1 is static relative to a second stop valve 223 located on the wheel. Second stop valve 223 is controlled pneumatically and can be moved into two positions, open position 223a and closed position 223b biased by spring means 223c. Valve 223 is operated by charging port 223d via the control circuit 230. By charging port 223d, valve 223 can be moved against the spring 223c into an open position 223a to connect the interior of the tire to the supply line L1. Port 223d is connected to pilot control valve 234 which has two operating conditions for providing pilot control. Pilot control valve 234 is biased into closed position 234a by a spring means 234b and can be moved to an open position 234c to allow air flow. In the closed position 234a, port 223d is connected to the atmosphere. The valve 234 may be moved into the open position 234c against the force of the spring 234b by energising solenoid 234d which is electrically connected to control unit 70. For clarity reasons, the electric connections to the control unit 70 are only indicated by a double arrow.

By charging port 223d via pilot control valve 234, valve 223 can be moved against the spring 223c into an open position 223a to connect the interior of the tire to the supply line L1.

During operation of the tractor and when the TPCS is in a stand-by mode, second stop valve 223 is in a closed position to close the tire volume.

The term operation of the vehicle or machine is defined herein as meaning that the vehicle or machine is in a condition that its system or systems are sufficiently powered to for operation, for example, with the engine running. The term shut down of the vehicle is defined herein as meaning that the tractor is in a condition that its system, or systems are not sufficiently powered for operation, for example when the ignition key is removed and the driver leaves the tractor.

Referring to TPCS the term stand-by mode is defined herein as meaning that the TPCS is in a condition wherein no change in tire pressure is done by the driver or an automatic control system but measurements or monitoring functions may still function. The TPCS Active mode is characterised by any change in tire pressure.

If the vehicle is not in operation (shut down), TPCS is also out of operation as supply of any electric or pneumatic energy supply is cut. Consequently, in this condition the TPCS is in neither stand-by, nor in Active mode.

If the tire pressure is adjusted (by manual input by the driver or an automatic control system), first and second stop valve 222, 223 are moved to their open positions 222a and 223a.

If the tires are inflated (tire pressure is increased), main control valve 221 is adjusted so that the tire is connected to the main TPCS line L0 and the tire is charged with air. Depending on the design, the pressure adjustment may be done in two ways. Main control valve 221 is fully opened until the tire pressure, monitored by first pressure sensor 38 reaches the demanded value. Alternatively, main control valve 221 is opened to a position corresponding to the required pressure and closes when the value is reached.

In case of deflation, main control valve 221 may be moved into a position in which the valve 221 is connected with the atmosphere at port 221b and air is discharged until the demanded pressure value, monitored by first pressure sensor 38, is reached.

At the end of any inflation or deflation process, second stop valve 223 is moved to a closed position.

To measure the current tire pressure $P_c$ of tire 2a, the second stop valve 223 is opened so that air from tire 2a flows from the tire along supply line L1 to first stop valve 222. If the opening and closing of the second stop valve 223 is controlled by a tractor control unit 70, the second stop valve 223 can be opened automatically for a defined period of time before closing to achieve a static pressure in the respective supply line. The pressure in the supply line between the tire and the first stop control valve 222 can be measured by pressure sensor 38 which represents the pressure in the tire.

The restriction 225 is used to determine the pressure differential. The pressure sensor 38 thereby provides the pressure in the supply line between the restriction 225 and main control valve 221 while a second pressure sensor 39 measures the pressure of the other side of the restriction 225. Both sensors are used to calculate the pressure differential $\Delta p$ across the restriction 225. In this case, sensors 38, 39 measure the dynamic pressure within the arrangement.

Main control valve 221 and stop valve 222 are fully opened during inflation and pressure measurements taken by sensors 38, 39 are not influenced as the pneumatic resistance is known and is approximately constant. Using a separate restriction 225 has the major advantage that the pressure differential is increased which increases the accuracy of the measurement.

By calculating the pressure differential $\Delta p$, the air flow rate Q of the air being supplied to the tire can be calculated. By air flow rate Q, it is meant the volume of air passing a given point per unit time. The relation of pressure differential, $\Delta p$ and air flow rate, Q across a restriction depends on various parameters including fluid viscosity, fluid compressibility and the geometry of the restriction. The theoretical basis of the relationship between pressure differential, $\Delta p$ and air flow rate, Q are described in various publications and considered to be general engineering knowledge so that further detailed explanation is not necessary.

For the embodiment described herein, the parameters can be summarised in a constant, C since the geometry of the restriction is known and remains constant and the fluid parameters mentioned above do not vary significantly within the operational range of the TPCS. This results in a simplified equation:

$$Q = C \times \sqrt{\Delta p}$$

If C cannot be considered to be constant, the relation between air flow rate, Q and pressure differential $\Delta p$ could also be taken from tire characteristic maps stored in the tractor control unit or TPCS control unit.

The tire pressure difference, $\Delta p_T$ which the tire has to be increased by to achieve the desired pressure, $P_d$ is calculated by subtraction of the desired tire pressure, $P_d$ from the current tire pressure, $P_c$. For a tire with known dimensions, a relationship between the tire pressure difference $\Delta p_T$ and the necessary increase in tire air volume $\Delta V$ can be derived in order calculate the volume of air needed to be supplied to achieve the desired tire pressure, $P_d$. This relationship is considered to be general engineering knowledge that the skilled person would know so that further detailed explanation is not necessary.

A characteristic map is stored in the tractor control unit or TPCS control unit which provides the relationship between the tire pressure difference, $\Delta p_T$ and tire air volume increase, $\Delta V$ across the operational range of the TPCS. Knowing the relationship between tire pressure difference $\Delta p_T$ and tire air volume increase $\Delta V$ for tire inflation, the same can be applied when the tire is deflated. So a characteristic map can be stored for both tire inflation and deflation.

Details of the air supply, especially the function of compressor 10, EOD 100 and the consumer branch 20 are now explained.

Compressor 10 is equipped with idler means 11 to provide an idle mode in which the air flow is reduced to a rate of 15% of the maximum air delivery of 1000 liters per minute. Alternatively, this efficiency function may be provided by an OFF/ON clutch cutting mechanical drive of compressor 10. Furthermore, the compressor 10 may be electrically driven and the electric supply may be switched off by idler means 11.

The ECAD 100 comprises a dryer 101 comprising a cartridge filled with drying granules, a discharge valve 102, a regeneration valve 103, a compressor idler valve 104 and a check valve 105. For clarity reasons, the electric connections of valves 102, 103 and 104 to the control unit 70 are only indicated by a double arrow. The granule cartridge extracts water from the air passing through it.

Figure 2A:
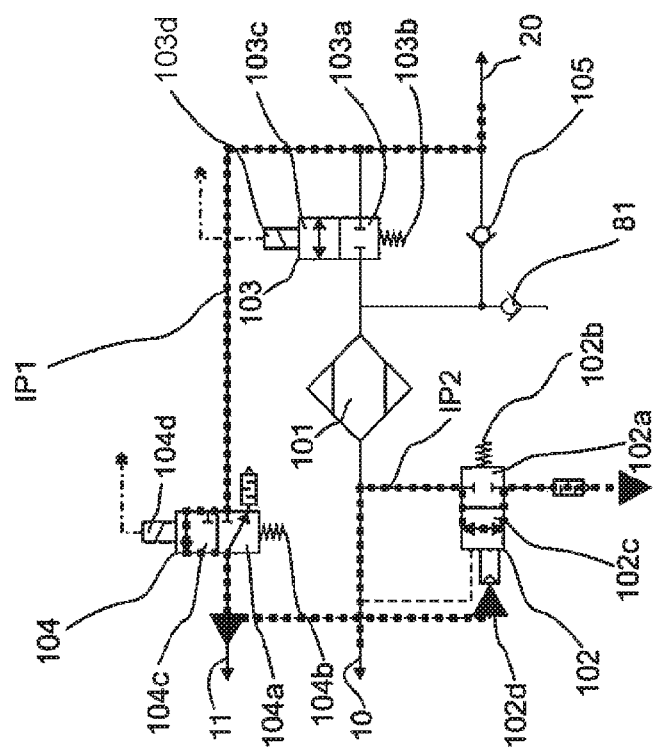

With reference to FIGS. 2a to 2d, the standard operating modes of the EOD are now explained:

Loading Mode (FIG. 2a)

When a consumer requires air, air from compressor 10 flows to the consumer branch 20 via dryer 101 and check valve 105 as shown by the dotted path LP. During loading, discharge valve 102 is in its closed position 102a biased by spring 102b, as shown in FIG. 2a. The dryer regeneration control valve 103 and idler valve 104 are also in their closed position 103a/104a biased by springs 103b/104b. Air flow in an opposite direction, that is from the consumer branch 20 to compressor 10 is prohibited by check valve 105.

Figure 2B:
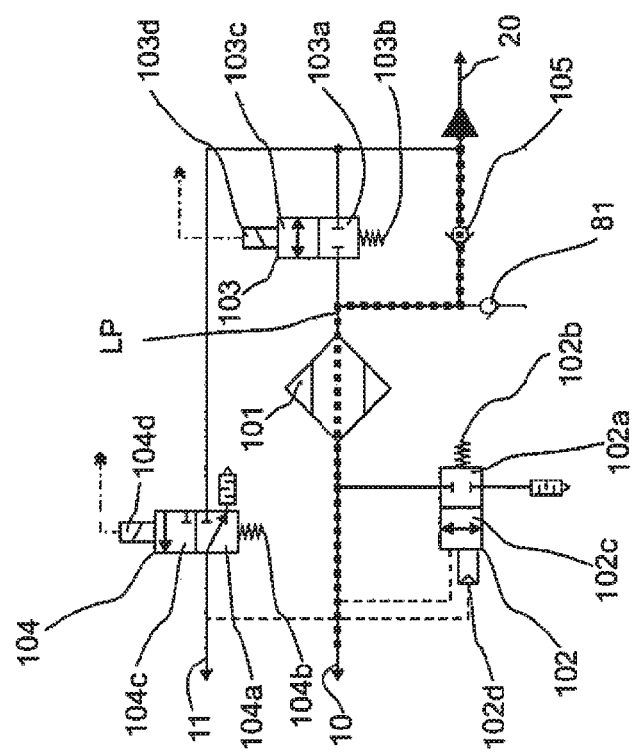

Idle Mode (FIG. 2b)

If the consumer branch 20 is provided with sufficient air flow, the pressure is about 8.5 bar (this pressure is measured by sensors in reservoirs 31, 41). If this pressure is exceeded because compressor 10 is still working, the control unit 70 switches the compressor idler valve 104 from the closed position 104a (biased by spring 104b) to the open position 104c by energizing solenoid 104d to guide the air along path IP1 from the consumer branch 20 to the compressor idler 11. After compressor idler valve 104, the air flow is branched-off via port 102d to move discharge valve 102 to open position 102c for connection of the compressor 10 to the atmosphere. The compressor idler 11 keeps the compressor 10 in this energy saving mode as long as pressure is applied. For normal operation, the compressor idler 11 must be connected to the atmosphere and this is done by valve 104 when in closed position 104a.

Thereby the remaining air flow (approximately 15% of the volume of air in the system) is discharged to the atmosphere with minimum resistance via discharge valve 102 along path IP2.

Overpressure Protection (FIG. 2c)

If the pressure in the EOD circuit rises to a level above a permitted operating pressure, discharge valve 102 is opened via path OP1 so that the connection of the compressor 10 to the atmosphere is opened (indicated by path OP2). This function is a safety function when the electronic control fails or a blockage occurs which would also result in an incorrect pressure detection at pressure sensors 32, 42.

Regeneration (FIG. 2d)

Regeneration through the cartridge of dryer 101 may be achieved by using air from consumer reservoirs 31, 41 or any other reservoir connectable in a similar manner. For example, the EOD 100 may be provided with its own regeneration reservoir. Compressor idler valve 104 is opened to position 104c first so that the compressor 10 is brought into the idle mode (as explained above for the IDLE MODE) and air flows along path IP1.

In addition, regeneration valve 103 is moved from its closed position 103a (biased by spring 103b) to the open position 103c by energizing solenoid 103d so that air from reservoir 31, 41 can by-pass the check valve 105 and enter the cartridge of dryer 101 along path RP1. As discharge valve 102 is already opened to position 102c via path IP1 and port 102d, the air regenerating the dryer cartridge 101 and the air coming from the compressor 10 in the idle mode is discharged to the atmosphere.

As already discussed above, the regeneration process requires a defined air flow which is taken from consumer reservoirs 31, 41 or reservoirs integrated in the dryer (not shown in the embodiment above). This reduces efficiency as this air flow is then not available for supplying consumers.

In accordance with the invention and as shown in FIG. 1, port 221b of valve 221 through which deflated air from the tire flows is connected with the EOD 100 to use the air (which is normally discharged to the atmosphere during deflation) for the regeneration of the dryer. Therefore, port 221b is connected to the EOD 100 via line 80 and port 110. As a consequence, all the air deflated from the TPCS would be guided through the dryer 101. Alternatively, a valve may be provided in line 80 which could selectively connect the line 80 to the atmosphere. In that case, air deflated from the TPCS could be discharged to the atmosphere without passing dryer 101 if applicable. This would also have the main advantage that the rotatable passage 240 could be connected to the atmosphere so that the seals on the rotatable passage 240 (not shown) do not contact a non rotating surface.

Furthermore line 80 may be equipped with a filtration means (not shown) so that the air from the tire is cleaned before it is used for the regeneration of the dryer 101. This may be necessary as due to wear of the rubber tires, debris may be found inside the tires due to the tire becoming porous and tire particles are shed, or debris may be introduced into the tires from an external air source.

Figure 3:
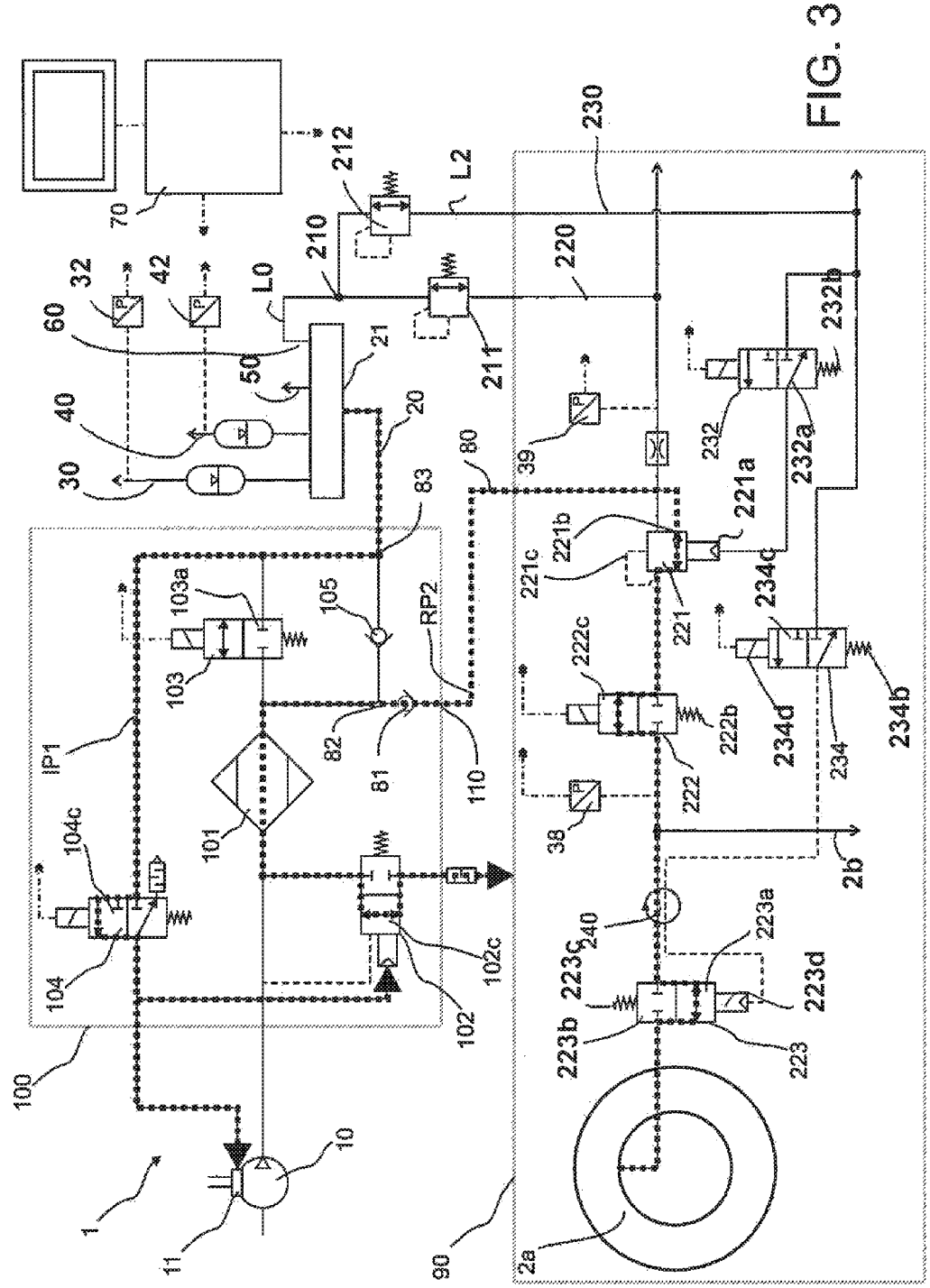
FIGS. 3 and 4 are circuit diagrams of the Electrically Operated Air Dryer showing different modes of operation in accordance with the invention.

Inside the EOD 100, port 110 is connected to the dryer 101 at connection 82 which is positioned between dryer cartridge 101 and check valve 105 as shown in FIG. 3.

As shown in FIG. 3, for regeneration of dryer 101 air from the TPCS flows along line 80 (indicated with path RP2) while compressor 1 is switched to an idle mode. In the idle mode air flows along path IP1 and opens valve 104 to position 104c so that the compressor 10 does not block regeneration with its higher air flow/pressure level.

Simultaneously, discharge valve 102 is opened to position 102c for connection to the atmosphere so that moisture is discharged to the atmosphere. Valve 103 must be closed (position 103a) as shown in FIG. 3 to avoid short circuit with reservoirs 31, 41. Check valve 81 is needed to block air flow in the modes independent of TPCS as described in FIGS. 2a to 2d.

Alternatively, if reservoirs 31, 41 of the consumer branch 20 are empty (so that the pressure level in path RP2 is higher than the pressure in the consumer branch 20) air from path RP2 could be used to provide air for path IP1. At connection 82 air could flow to check valve 105 and enter path IP1 at connection 83. This would enable the regeneration of the dryer 101 even if the compressor 10 is off or the consumer branch is empty (presuming that tires can provide sufficient air).

Further functions are provided using air deflated from the tires as flow regeneration for the dryer 101.

Air Volume Monitoring

The air needed for regeneration is a default setting. The TPCS system can determine the amount of air released during inflation and deflation as explained above. It can therefore compare the volume of air deflated from the tire with the volume required for regeneration and calculate if sufficient air has been deflated from the tire or not.

For example, if 120 liters of air is required for the regeneration of the dryer and the TPCS deflation process deflates the tire from, for example, 1.8 bar to 1.7 bar, the TPCS will only be able to deliver 100 liters for regeneration. In such a case, the system can also use some of the air in the reservoirs 31, 41 to complete the regeneration.

Compressor Deactivation Before TPCS

As with regeneration using air from the reservoirs 31, 41, regeneration via the TPCS requires that the compressor 10 is not fully delivering, so the compressor 10 must be brought into an idle mode, or switched off.

Alternatively, the control unit may postpone deflation, for example, if the reservoirs 31, 41 need immediate refilling.

Filling the Reservoir after Shut Down

Most air supply systems suffer from the fact that air is lost during longer periods of shut down of the vehicle, such as overnight. After starting the vehicle again, some initial time is required to fill the consumer reservoirs 31, 41 to be ready for operation.

In accordance with the invention, the tire is used as an air reservoir for long periods of shut down of the tractor, such as overnight. The system can decide the conditions of the reservoir before shut down. If the reservoirs 31, 41 show a high pressure, the tires may be inflated to a pressure level which is higher than the level in operation. The system is then shut down.

After restarting the tractor, the tire is deflated to a desired tire pressure and the deflated air is used to fill the reservoirs to the desired pressure without using the compressor 10.

Figure 4:
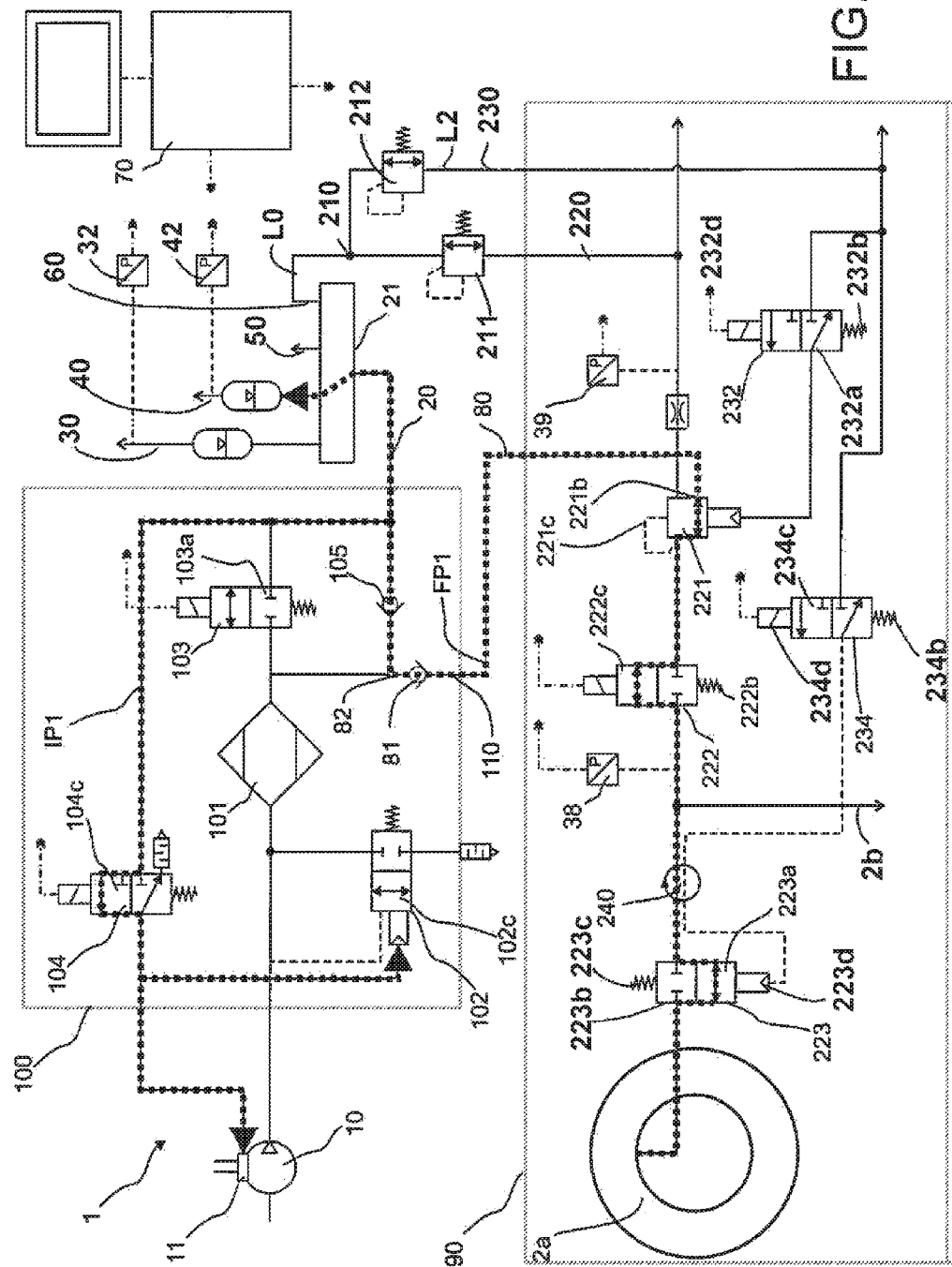

For filling the reservoirs 31, 41 with air from the tire 2a, the pressure level of the reservoir must be lower than that in the tire 2a, but sufficient to open valve 223 on tire 2a. As shown in FIG. 4 the air will flow along the path FP1 to reservoir 30 or 40 and towards valve 104.

If compressor 10 is already running, that is the tractor engine is on, then the compressor 10 must be switched to the IDLE MODE by moving valve 104 to open position 104c so that air flows along path IP1.

If the compressor 10 is not running, the pressure in reservoirs 31, 41 must be sufficient to open valve 223 at tire 2a. If valve 223 is electrically operated, no initial pressure in the reservoirs is required as pressure from the tire may be sufficient for operating valve 104. The other valves 103 and 102 will move into the correct positions due to spring biasing when shut down.

Monitoring External Filing

If the tires are inflated by an external source, for example, from a garage compressor, it is possible that humid air is introduced into tires 2a. Using the humid air for regeneration in such a case would further worsen the condition of the dryer.

The system can detect external filing since the tire pressure will increase without activation of the TPCS. The TPCS or control unit 70 stores the desired pressure in the tires after each TPCS operation, even if the vehicle is shut down. Leakage would result in a tire pressure decrease but if the tire pressure has increased, external filling has been provided so that the air may be more humid than required for flow return.

If the TPCS is then deflated and guides the moist air through the dryer 101, no regeneration drying effect is provided since more moisture is brought into the system. As a consequence, the system can decided to conduct regeneration by using air from the TPCS and the reservoirs 31,41, or using air solely from the reservoirs 31, 41, or by conducting an extended regeneration using air from the reservoirs to discharge the additional air brought into the tires as a consequence of external filling as shown in FIG. 4.

EOD Dryer Provided with Port for Inserting TPCS

The EOD 100 must be provided with an additional TPCS input port 110 (shown in FIG. 3) and check valve 81. The port must be connected to the dryer 101 such that the regeneration valve 103 and check valve 105 can be by-passed as shown in FIGS. 1 and 3.

Figure 5:
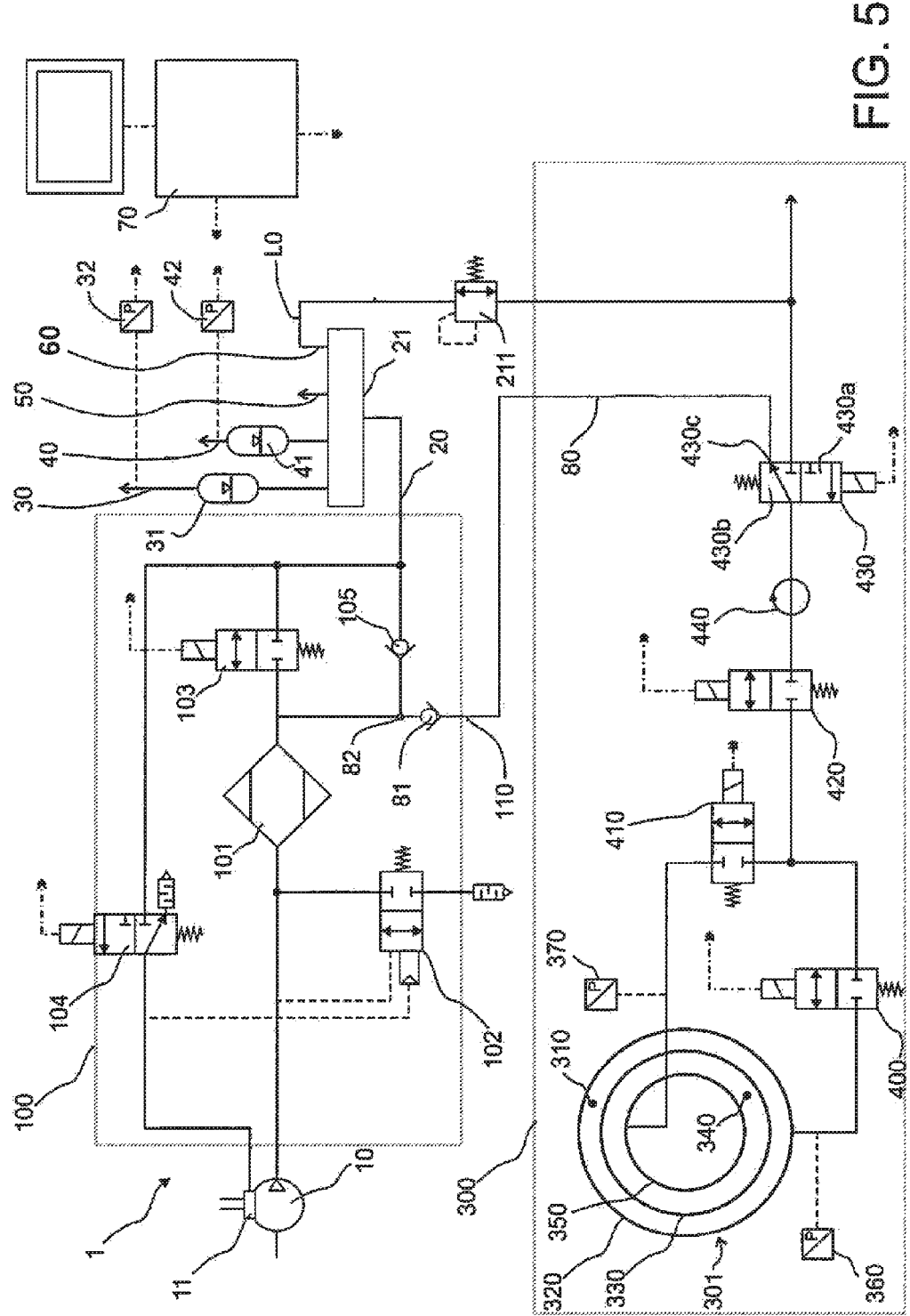
FIG. 5 is a circuit diagram of an alternative Tractor Pressure Control System with an Electrically Operated Air Dryer embodying the invention.

The invention as described above is described with reference to one embodiment of a TPCS. The invention can also be used with alternative embodiments of TPCS, such as the one shown in FIG. 5. In FIG. 5, the EOD circuit and components of FIGS. 1 to 4 are shown connected to an alternative TPCS 300 which is described in detail in the applicant's granted patent EP2196336. The wheel 301 of FIG. 5 is provided with an inner tire 330 and an outer tire 320.

A first tire reservoir 310 is enclosed between the outer tire 320 and the inner tire 330 and is mainly used to adjust the pressure of the wheel. A second tire reservoir 340 is enclosed between inner tire 330 and the tire rim 350 and is mainly used to store compressed air at a relatively high pressure (around 6-8 bar) which is supplied by the compressor 10 or protection valve means 21. A first sensor 360 is assigned to first tire reservoir 310 and a second sensor 370 is assigned to second tire reservoir 340.

TPCS 300 provides a second tire air reservoir 340 at a higher pressure level compared to the pressure in a first tire air reservoir 310 wherein both reservoirs are fluidly connectable. In accordance with the present invention, air from the first or second reservoir 310, 340 is used for regeneration and for refilling the reservoirs 31, 41 assigned to consumers 30, 40 after shut down.

For controlling the functions of the TPCS 300, valves 400, 410, 420 and 430 are provided. Pressure sensors 360 or 370 and valves 400, 410, 420 and 430 can communicate with control unit 70 via wireless communication, or by an electrical rotatable passage (not shown).

A rotatable passage 440 pneumatically connects the rotatable wheel 301 and the components mounted on the wheel 420, 410, 400 to valve 430 which is mounted on the tractor chassis.

The operating conditions of the TPCS of FIG. 5 are:

Direct Tire Inflation

For inflation of first reservoir 310 directly via compressor 10, consumer branch 20 and line L0, valve 410 is closed (as shown in FIG. 5) and valves 400, 420 are opened to allow air to flow to reservoir 310. Valve 430 is brought to position 430a so that line 80 is closed and the line to the tire is open. Pressure sensor 360 is used to monitor the tire pressure and to stop the inflation process when the desired pressure is reached. Alternatively, characteristic maps may be used to calculate the volume of air required to attain a desired tire pressure (or, if the air flow rate is known, the inflation time can be calculated).

Tire Inflation Via Second Tire Reservoir 340

In this mode, valve 420 is closed and valve 430 is moved to a closed position 430b. If valves 400 and 410 are then opened, air can flow from the second reservoir 340 to the first reservoir 310.

Filling the Second Tire Reservoir 340

For filling the second reservoir 340 via compressor 10, consumer branch 20 and line L0, valve 400 is closed (as shown) and valves 410, 420 are open. Valve 430 is moved to open position 430a.

Tire Deflation (Reducing Pressure in First Tire Reservoir 310)

In this mode, valves 400, 420 are open, valve 410 is closed and valve 430 is moved to position 430a. In accordance with the invention, port 430c is connected to port 110 of EOD 100 to guide air back to the EOD 100 or to the reservoirs 31, 41.

With reference to the invention, an air supply system comprising TPCS 300 offers the same functions of regeneration, air volume monitoring, compressor deactivation before TPCS and filling the reservoir after shut down as those previously described for an air supply system comprising TPCS 90.

More specifically:

Regeneration

For regeneration using air deflated from the wheel 301, valve 410 is closed, valves 400 and 420 are opened and valve 430 is brought into position 430b so that air flows from the first reservoir 310 in the tire to dryer 101.

Advantageously, regeneration without using air deflated from the tire can be performed without affecting the pressure of the tire, that is without affecting the pressure of the first reservoir 310. This performed by deflating air from the second reservoir 340. This is achieved by closing valve 400, opening valves 410, 420 and bringing valve 430 into position 430b so that air can pass from the second reservoir 340 in the tire to the dryer.

Filling the Reservoir after Shut Down

TPCS 300 has the advantage that the reservoir 340 holds air at high pressures so that the consumer reservoirs 31, 41 are filled more easily and more quickly than using the air from reservoir 310. This is because the pressure of air in the reservoir 310 is lower than the pressures of consumer reservoirs 31, 41. This is especially advantageous for refilling after shut down.

The invention as described in both embodiments permits regeneration of a dryer using air from the consumer reservoirs 31, 41, or using air from the tire during deflation, or using air from both the tire and the consumer reservoirs.

The invention is not restricted to the types of TPCS described herein but may be used when air deflated from the tire is used for the regeneration of a dryer.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. An air supply system on a vehicle for inflating and deflating a tire, said system comprising a compressor connected to a dryer having drying material to extract water from the air and a deflation line connectable between the tire and the dryer, said dryer operable in a first mode in which air passing through the dryer in a first direction is dried by the dryer and a second regeneration mode wherein air passes through the dryer in a direction opposite to the first direction to remove water collected by the dryer, characterized in that the air used for the regeneration is air deflated from the tire, wherein the system calculates a first value representing a volume of air deflated from the tire and a second value representing a volume of air needed for the regeneration and compares said first and second values to calculate if there is sufficient deflated air for the regeneration.

2. The air supply system as claimed in claim 1 wherein if the second value is greater than the first value, the regeneration is provided using air deflated from the tire and using air from a reservoir of the dryer, or of a consumer.

3. The air supply system as claimed in claim 1 wherein the compressor is deactivated to enable deflated air from the tire to be fed to the dryer.

4. The air supply system as claimed in claim 1 wherein the system postpones deflation of the tire if the compressor is not deactivated.

5. The air supply system according to claim 1 further comprising a tire pressure control system (TPCS) circuit and a dryer circuit, wherein the compressor and dryer are located in the dryer circuit having a flow return valve arranged so that air supplied by the compressor to the tire is dried and said dryer circuit further comprising a port connectable to the TPCS circuit so that air deflated from the tire through the TPCS circuit passes through the dryer for the regeneration.

6. The air supply system as claimed in claim 5 wherein the air taken from the TPCS circuit is provided by a reservoir located within the tire.

7. The air supply system as claimed in claim 1 further comprising a control unit that determines when the tire is inflated by an external air supply, and when the control unit determines that an external air supply has inflated the tire, the system uses air from a reservoir of a consumer for the regeneration.

8. The air supply system as claimed in claim 7 wherein the control unit determines there is an increase in tire pressure, but the compressor has not been used to inflate the tire, the system detects the use of an external air supply.

* * * * *